(12) United States Patent
Salmond et al.

(10) Patent No.: US 6,338,221 B1
(45) Date of Patent: *Jan. 15, 2002

(54) CROP

(76) Inventors: Colin Herbert Salmond, Old Peachester Road, Beerwah, Queensland, 4519; Peter John McGruddy, Menary Road, Nambour, Queensland, 4560, both of (AU)

(*) Notice: Subject to any disclaimer, the term of this patent is extended or adjusted under 35 U.S.C. 154(b) by 0 days.

This patent is subject to a terminal disclaimer.

(21) Appl. No.: 09/375,438

(22) Filed: Aug. 17, 1999

Related U.S. Application Data

(63) Continuation-in-part of application No. 08/813,938, filed on Mar. 3, 1997, now Pat. No. 5,956,895, which is a continuation of application No. 08/362,565, filed as application No. PCT/AU93/00322 on Jul. 1, 1993, now abandoned.

(30) Foreign Application Priority Data

Jul. 1, 1992 (AU) .............................................. PL3281

(51) Int. Cl.[7] .................................................. A01H 1/04
(52) U.S. Cl. ...................................................... 47/58.1
(58) Field of Search ............................ 47/58.1; 356/126

(56) References Cited

U.S. PATENT DOCUMENTS

| | | |
|---|---|---|
| 3,468,607 A | 9/1969 | Sloane et al. |
| 3,999,856 A | 12/1976 | Unterleitner |
| 4,650,336 A | 3/1987 | Moll |
| 5,131,185 A | 7/1992 | Wingerden |

FOREIGN PATENT DOCUMENTS

| | | |
|---|---|---|
| EP | 0 194 273 | 8/1988 |
| SU | 382388 | 10/1973 |
| SU | 404452 | 8/1974 |
| SU | 494149 | 12/1975 |
| SU | 0494149 | * 12/1975 |
| SU | 665859 | 6/1979 |
| SU | 810161 | 3/1981 |
| SU | 1139389 | 2/1985 |
| SU | 1371612 | 2/1988 |
| SU | 1604268 | 11/1990 |
| SU | 1709956 | 2/1992 |
| WO | WO 90/10377 | 9/1990 |
| WO | WO 92/03907 | 3/1992 |

OTHER PUBLICATIONS

J. Levitt, "Introduction to Plant Physiology", The C.V. Mosby Company, 1969, pp. 280–286.*

J. Levitt, "Introduction to Plant Physiology", The C.V. Mosby Company, 1969, pp. 280–286.

* cited by examiner

*Primary Examiner*—Charles T. Jordan
*Assistant Examiner*—Jeffrey L. Gellner
(74) *Attorney, Agent, or Firm*—Young & Thompson

(57) ABSTRACT

Improved crop yields are obtained by determining total dissolved solids (TDS) in a representative sample of transplants to determine strike rate as a logarithmic function of TDS before transplanting. Juvenile plants with high strike rate readings are transplanted. A refractometer having a logarithmic scale showing low medium and high strike rates as a direct readout from a juice sample is used. A bioregulator can be used to induce high TDS levels prior to transplanting. Particular application is to transplanting strawberry runners.

11 Claims, 15 Drawing Sheets

| | Date | State | Grower | Variety | TDS | Strike | Treatment | Chiller |
|---|---|---|---|---|---|---|---|---|
| 1 | 1 | VIC | 1 | Parker | 0.100 | 0.9500 | Docked Stems | 1.0000000 |
| 2 | 1 | VIC | 2 | Parker | 0.100 | 0.9600 | Docked Stems | 1.0000000 |
| 3 | 3 | VIC | 2 | Tioga | 0.110 | 0.9500 | Docked Stems | 3.0000000 |
| 4 | 2 | NSW | 3 | Tioga | 0.080 | 0.1000 | Docked Stems | 1.0000000 |
| 7 | 3 | VIC | 7 | Chandler | 0.095 | 0.8500 | Docked Stems | 1.0000000 |
| 8 | 3 | VIC | 1 | Chandler | 0.100 | 0.9799 | Docked Stems | N/A |
| 9 | 3 | VIC | 6 | Chandler | 0.110 | 0.9799 | Docked Stems | N/A |
| 10 | 3 | VIC | 8 | Chandler | 0.115 | 0.9799 | Docked Stems | N/A |
| 11 | 2 | VIC | 6 | Chandler | 0.140 | 0.9800 | Docked Stems | 1.0000000 |
| 12 | 2 | VIC | 6 | Douglas | 0.090 | 0.9400 | Docked Stems | 1.0000000 |
| 15 | 3 | VIC | 5 | Selvn | 0.130 | 0.9600 | Docked Stems | 4.0000000 |
| 17 | 3 | VIC | 11 | Parker | 0.115 | 0.9500 | Docked Stems | 1.0000000 |
| 18 | 3 | NSW | 5 | Tioga | 0.080 | 0.2500 | Docked Stems | 3.0000000 |
| 19 | 3 | QLD | 3 | Tioga | 0.090 | 0.3500 | With Leaves | 0.2857143 |
| 20 | 2 | NSW | 12 | Tioga | 0.090 | 0.3000 | Docked Stems | 1.0000000 |
| 21 | 3 | VIC | 3 | Parker | 0.085 | 0.9960 | Docked Stems | 1.0000000 |
| 22 | 3 | VIC | 2 | Chandler | 0.130 | 0.9980 | Docked Stems | 2.0000000 |
| 23 | 3 | VIC | 6 | Chandler | 0.120 | 0.9700 | Docked Stems | 2.0000000 |
| 24 | 3 | VIC | 11 | Chandler | 0.125 | 0.9980 | Docked Stems | 2.0000000 |
| 25 | 3 | VIC | 6 | Qld Red | 0.100 | 0.9900 | With Leaves | 0.1428571 |
| 27 | 4 | QLD | 10 | Tioga | 0.075 | 0.1000 | With Leaves | 0.1428571 |
| 28 | 4 | QLD | 13 | Pahnro | 0.120 | 0.9950 | Docked Stems | 1.0000000 |
| 29 | 4 | VIC | 2 | Tioga | 0.090 | 0.9700 | With Leaves | 0.1428571 |
| 30 | 4 | QLD | 14 | Qld Red | 0.095 | 0.9500 | With Leaves | 0.1428571 |

FIG. 1

|    | Date | State | Grower | Variety | TDS   | Strike | Treatment     | Chiller/wks |
|----|------|-------|--------|---------|-------|--------|---------------|-------------|
| 31 | 4    | NSW   | 3      | Tioga   | 0.09  | —      | Defoliated 6.0 | —           |
| 32 | 5    | NSW   | 3      | Tioga   | 0.11  | 12%    | Defoliated 6.0 | 6-7         |
| 33 | 4    | NSW   | 3      | Tioga   | 0.13  | 8%     | Defoliated 5.0 | 6-7         |
| 34 | 4    | NSW   | 3      | Tioga   | 0.10  | 14%    | Defoliated 5.0 | 4-5         |
| 35 | 4    | NSW   | 3      | Tioga   | 0.10  | 18%    | Defoliated 5.0 | 4-5         |
| 36 | 4    | NSW   | 3      | Tioga   | 0.105 | 12%    | Defoliated 5.0 | 4-5         |
| 37 | 4    | NSW   | 3      | Tioga   | 0.10  | 9%     | Defoliated 5.0 | 4-5         |
| 38 | 4    | VIC   | 3      | Tioga   | 0.15  | 40%    | Defoliated 4.0 | 6-7         |
| 39 | 4    | VIC   | 2      | Parker  | 0.155 | 10%    | Defoliated 4.0 | 6-7         |
| 40 | 4    | VIC   | 1      | Parker  | 0.14  | 80%    | Defoliated 4.0 | 6-7         |
| 41 | 4    | VIC   | 1      | Parker  | 0.145 | 48%    | Defoliated 4.0 | 6-7         |
| 42 | 4    | NSW   | 3      | Tioga   | 0.13  | 8%     | Defoliated 5.0 | 6-7         |

FIG. 3

| | BED 1 CCC (40,000 ppm) | BED 2 CCC (30,000 ppm) | BED 3 CCC (20,000 ppm) | BED 4 CCC (1,000 ppm) | BED 5 CCC (Control No Spray) |
|---|---|---|---|---|---|
| Mother Plants TDS% | 16.6<br>16.4<br>14.8<br>12.0<br>10.4 | 15.4<br>13.8<br>11.4<br>9.2<br>— | 17.2<br>16.6<br>14.4<br>13.6<br>— | 11.6<br>11.2<br>10.2<br>—<br>— | 10.6<br>10.2<br>—<br>—<br>— |
| Runner Plants TDS% | 11.4<br>11.0<br>9.4 | 11.0<br>10.8<br>9.4 | 11.0<br>10.8<br>— | 11.2<br>11.0<br>— | 9.4<br>7.8<br>— |

FIG. 6

Glucose Correlation

Fructose Correlation

CROP

This application is a continuation-in-part of U.S. application Ser. No. 08/813,938 filed Mar. 3, 1997, now U.S. Pat. No. 5,956,895, which is a continuation of abandoned application Ser. No. 08/362,565 filed Feb. 28, 1995, which is the 35 USC 371 national stage of international application PCT/AU93/00322 filed on Jul. 1, 1993.

TECHNICAL FIELD OF THE INVENTION

THIS INVENTION relates to an improved crop and to a process for reducing plant losses or enhancing plant recovery following stress related procedures, including but not limited to transplanting or pruning procedures.

BACKGROUND ART

The success of ventures involving commercial use of plants including-fruiting plants involves risks. Risks arise as a consequence of many variables. These include inter alia, the weather, unexpected climatic variations, the quality of juvenile plants and timing of artificially induced events, such as planting in relation to anticipated seasonal events and so forth. Many of these variables cannot be quantified and where, for example, planting takes place too late or too early and say, anticipated seasonal changes do not occur as hoped, or adverse weather interferes with events, the yield from a crop can be adversely effected. A venture can become unprofitable.

It is known that yield can be improved in mature plants by a process known as pruning. While the yield of the pruned plant compared to the unpruned plant is increased, the yield is not necessarily maximised because the yield depends on the plant's recovery from pruning induced stress. Similarly, where juvenile plants are transplanted, particularly where commercial numbers are concerned, plant losses occur as some plants cannot recover from the transplanting procedure. Moreover, recovery rates in a transplantation can be slow and this in turn can also effect overall yield. These problems are exacerbated in the large scale commercial environment as a 20% or even 10% reduction in yield from year to year can mean the difference between profit and loss.

At present, conditions considered appropriate to application of induced stress such as pruning or transplanting are evaluated on a qualitative basis having regard to, inter alia, season and visual appearance of plants. The applicant has found that the latter test can be deceptive insofar as assessing a plant's ability to withstand artificially induced stresses, particularly those associated with transplanting.

OUTLINE OF THE INVENTION

It is therefore an object of the present invention to alleviate at least to some degree the aforementioned problems of the prior art.

In one aspect therefore, the present invention resides in a crop having on average an improved yield due to a reduced plant loss rate or enhanced plant recovery rate following transplanting, pruning or like stress related procedures, the crop comprising, a plurality of plants, the plants having been selected according to a representative sample of said plants being quantitatively confirmed as being in a relatively high stress tolerance phase, said selection being according to a measurable characteristic of the representative sample of said plants being indicative of the plants being in the relatively high stress tolerance phase, prior to the stress related procedure being carried out.

In a further aspect, the invention resides in a process for reducing plant loss or enhancing plant recovery after subjecting a plant to artificially induce stress such as transplanting operations, pruning operations or the like, the process comprising the steps of:

(a) prior to subjecting the plant to the artificially induced stress, quantitatively confirming that the plant is in a relatively high stress tolerance phase by determining the state of the plants' energy according to a measurable internal characteristic of said plant, said measurable characteristic being indicative of the plant being in said relatively high stress tolerance phase; and (b) subsequently subjecting the plant to the artificially induced stress before said plant enters a relatively low stress tolerance phase.

In another aspect, the invention resides in a culling process for eliminating a high proportion of plants having relatively low stress tolerance from a plurality of independent plant populations, each plant population comprising a plurality of plants which are of the same production lot from a specific source, the culling process comprising the steps of:

(a) selecting a representative sample of plants corresponding to each population;

(b) quantitatively ascertaining whether said representative sample of plants is in a relatively low stress tolerance phase or a relatively high stress tolerance phase by determining the state of the plants' energy reserves according to a measurable internal characteristic of said plants in said sample being indicative of the plants' tolerance to stress; and (c) subsequently culling those populations of plants that correspond to the representative sample of plants which have been ascertained as being in a relatively low stress tolerance phase.

In a still further aspect, the invention resides in a process for preparing and selecting plants suitable for being subjected to artificially induced stress such as transplanting or pruning, the process including the steps of:

(a) selecting a representative sample of plants from a plant population, the plants of which are from the same production lot from a specific source;

(b) quantitatively ascertaining whether said plants in said representative sample are in a relatively high stress tolerance phase or a relatively low stress tolerance phase by determining the state of the plants' energy reserves according to a measurable internal characteristic of said plants in said sample is said measurable characteristics being indicative of said plants being in a relatively low or a relatively high stress tolerance phase;

(c) where said plants in said sample are shown to be in a relatively low stress tolerance phase, select all said plants in said population as being substantially stress intolerant and set them aside as being unsuitable to be subjected to said artificially induced stress; and (d) where said population has been set aside as being in a relatively low stress tolerance phase then subject said population to a process adapted to artificially induce a relatively high stress tolerance phase in said population;

(e) subsequently select a further representative sample from said population that has been subjected to said process adapted to artificially induce a relatively high stress tolerance phase;

(f) quantitatively ascertain whether said plants in said further representative sample have reached or have failed to reach an induced relatively high stress tolerance phase according to a measurable internal characteristic of said plants in said further representative sample, said measurable internal characteristic being indicative of a plant being in a relatively high or relatively low stress tolerance phase; and (g) where said plants in said further sample are shown to be in a relatively high stress tolerance phase select all said plants in said population as having been successfully artificially induced into a relatively high stress tolerance phase as being substantially stress tolerant and set them aside as being suitable to be subjected to said artificially induced stress.

In a still further aspect, the invention resides in an apparatus suitable for quantitatively ascertaining whether a plant is in a relatively high stress tolerance phase or a relatively low stress tolerance phase, the apparatus having a plant sample receiving station and a readout means adapted to provide a direct readout of a measurable characteristic of said plant sample indicative of the plant from which said plant sample has been taken as being in a relatively high or relatively low stress tolerance phase. Preferably, the direct readout provides an average measure of a whole population of related plants tolerance to stress as an average mortality or recovery rate related figure indicative of the stress tolerance of the population derived from a sample located in said sample receiving station.

The present invention can be applied to any crops where it is desirable to optimise yield by firstly identifying and optimising the time at which plants are subjected to induced stress so that afterwards a relatively high recovery rate can be expected. The present invention can be applied to commercial strawberry production as an illustration.

In the life of a strawberry plant, it is subjected to artificially induced stress. For example, juvenile plants, known as runners, are purchased from runner nurseries and transplanted by the strawberry grower. The yield from a crop of strawberries depends on, inter alia, the time at which planting takes place and the strike rate. The strike rate is a measure of the percentage of runners surviving following transplanting. The strike rate is therefore a measure of the tolerance of the crop to the transplanting procedure, assuming that normal external factors are constant. Prior to the present invention, transplanting has been subject to sporadic variations in strike rate, sometimes strike rates as low as 80% are recorded despite the runners, from a visual point of view, being healthy and also disease free. The applicant has found that runners which are disease free and visually sound may not be able to cope with transplanting because these plants can be in a relatively low stress tolerance phase which reduces the probability of the plant surviving which in turn reduces strike rate and hence, yield.

In the second and sometimes following years from transplanting, mature plants are subjected to a process known as "ratooning" where plants are cut-back or pruned. The yield depends on when ratooning takes place and how the plants recover from ratooning. The time at which and the amount by which plants are cut back is usually determined on a qualitative basis.

The present invention can also be applied to other commercial crop such as bananas and lychees.

As mentioned above, the processes disclosed herein and the apparatus mentioned above involve quantitatively ascertaining whether a representative sample of plants in a population is in a relatively low stress tolerance phase or a relatively high stress tolerance phase. The applicant has developed a procedure for ascertaining the stress tolerance phase of a plant, the preferred procedure in relation to strawberry plants and which can also be used for other plants involves ascertaining the "Total Dissolved Solids" (TDS) as a measure of the carbohydrate level and therefore energy stores of a plant. A plant with higher energy reserves is in a relatively high stress tolerance phase while a plant with lower energy reserves is in a relatively low stress tolerance phase. The applicant has found that stress tolerance varies exponentially so there is a fairly sharp threshold at which healthy plants become less tolerant to stress therefore qualitative tests are and have been in the past unsatisfactory in determining this important factor.

Total dissolved solids is determined by juicing a sample of a plant and then measuring the refractive index of the uncontaminated sample. In the case of strawberries, the sample can originate from any part of the plant including the leaves and roots but preferably, the sample is sourced from the crown and in older plants, the sample is sourced from the crown adjacent the top of the crown. The crown or part of the crown can be juiced and the TDS determined and from this, the applicant has devised a method for ascertaining the stress tolerance phase for the plant. The applicant has found the stress tolerance phase determined for a single plant or representative group of plants can be extrapolated to a population of plants which share a common origin and history with the sample plant or plants to obtain an average figure of tolerance and make predictions for the population.

An apparatus suitable for ascertaining the TDS is a refractometer where the refractive index of a juice sample relative to the refractive index of distilled water provides a measure of total dissolved solids and from the following description, it will be seen that the stress level or in the case of transplants, the strike rate is related to TDS is in terms of a logarithmic relationship. Therefore, the present invention includes a direct readout refractometer having a logarithmic scale indication of stress level. Typical quantitative measures that can be used as convenient and direct indications of a populations overall capability of coping with stress is a readout of "strike rate" for transplants, "recovery rate" for pruned plants and so forth. The applicant has found that these measures reflect on observable plant characteristics arising in a population following stress and these are related to the TDS measured for the sample plants.

The carbohydrate level may also be ascertained by measuring sugar concentrations in plants, such as by using a near infra-red (NIR) spectrometer to read the concentrations and non-destructively and insitu.

BRIEF DESCRIPTION OF THE DRAWINGS

In order that the present invention can be more readily understood and be put into practical effect, reference will now be made to the accompanying drawings which illustrate one embodiment of the present invention as applied to strawberry plants and wherein:

FIG. 1 is a table illustrating applications of the teachings of the present invention to transplantation of strawberry runners;

FIG. 3 is a table illustrating the effect of long term storage of strawberry runners on strike rate;

FIG. 6 is table illustrating induced relatively high tolerance in strawberry runners using a bio-regulator;

METHOD OF PERFORMANCE

Figure 2:
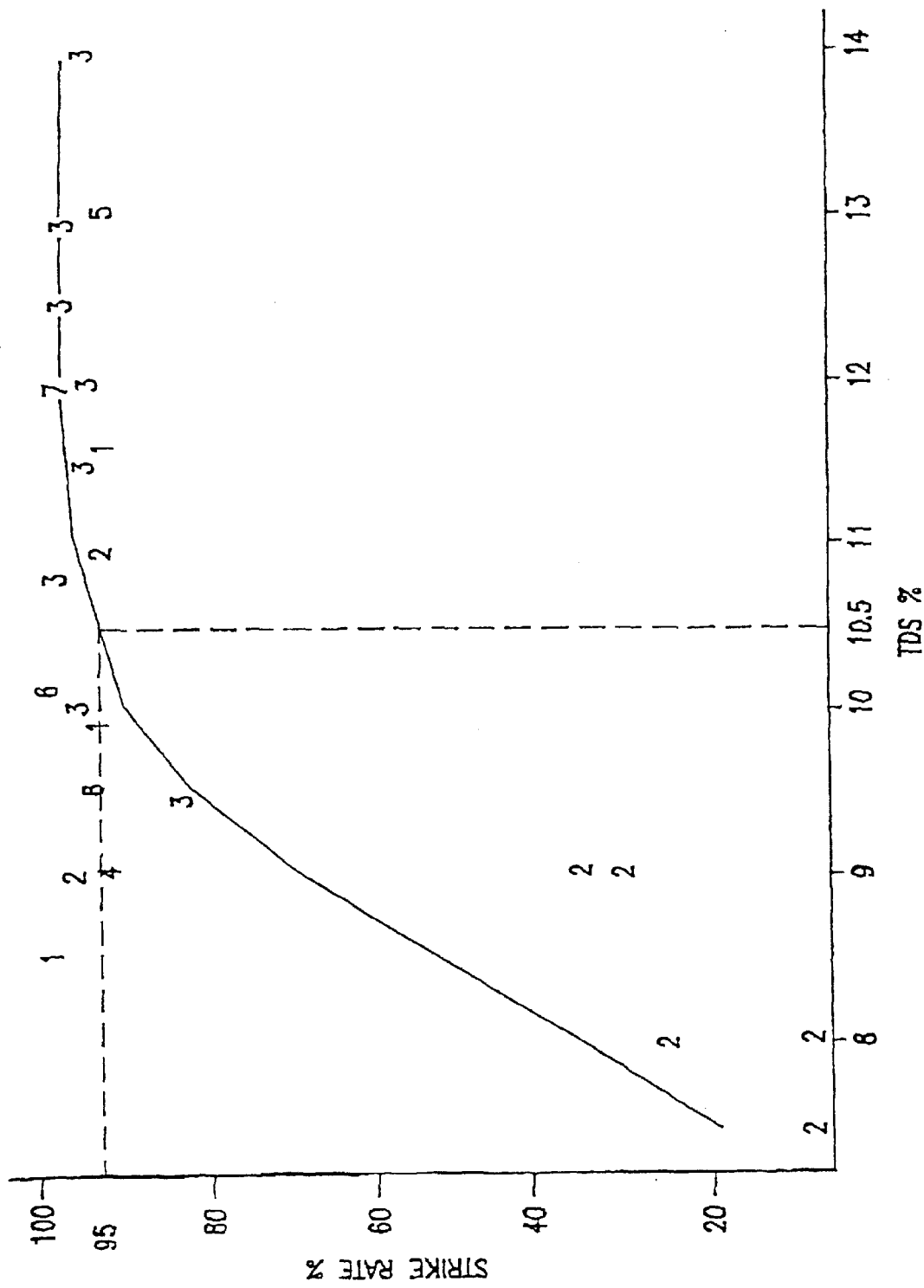
FIG. 2 is a graphical illustration of the data in FIG. 1 showing the relationship between strike rate, being a measure of the tolerance of a population of plants to transplanting as plotted against TDS readings.

Referring to FIG. 1, the table illustrates the measured relationship between TDS and strike rate for representative samples of strawberries from separate populations. Representative samples of strawberry runners from boxes of strawberry plants originating from different runner nurseries were tested to determine an extrapolated TDS value for the population of runners in the box. Each runner nursery was given a code, this code is listed in column 4 of the table with the state of origin being listed in column 3. Samples were prepared by extracting juices from the crowns, roots and leaves by placing these in a domestic juicer. After each sample was processed, the juicer was disassembled, washed, dried and reassembled before processing the next sample. Six plants were selected randomly from each box for the purpose of measurement. The variety, whether the stems had been docked, and the time (in weeks) the box of plants had been in cold storage is also given in the table.

A Carl Zeiss Jena refractometer number 236135*f ⅔ with 0% to 30% indices was used to read the total dissolved solids percentage (TDS) and readings were rounded to 0.5%. The refractometer used is commonly used to make total dissolved solids readings in relation to sugar cane and has a plus or minus 0.2% error factor but due to the cloudiness of the samples, the observed error rate was plus or minus 0.5%. The applicant has found that the error can be reduced by using a more coherent light source rather than natural light and to this end, a preferred form of refractometer uses a more coherent light source, typically a laser light source is used.

After measurements, the runners were transplanted and strike rates listed in the table were recorded from grower interviews a week from transplanting.

Readings were taken in a temperature range of 19° C. to 22° C., a temperature compensation table was not used for at these temperatures, the variations were 0.06° to 0.13°.

The boxes contained Department of Agriculture approved runners from Victoria and New South Wales. Local Sunshine Coast runners were also sampled. Queensland certified runners were not available. Nine varieties of runners were sampled from ten certified scheme nurseries. Forty-eight samples were recorded for TDS however only thirty-two strike rates at present are available.

Runners from populations revealed to have low strike rates were pathology tested and later after two weeks in the field to eliminate disease as a cause of the low strike rates. Other factors considered in relation to the low strike rates were reasonable grower management control of other perimeters such as drying of roots in the planting process; crowns planted below the soil level; inadequate land/tilth preparation; lack of drainage of water; planting too early after fumigation and damaged by malfunctioning chillers were eliminated as causing the low strike rates. Strike rates could therefore be directly attributed to characteristics of the plants revealed by the TDS measurements.

For a sample runner, the leaves and stem gave a TDS of 7%. The crown gave a TDS of 8%; and the roots gave a TDS of 5%. It was therefore apparent that TDS measurements could adequately be carried out in relation to the leaves, roots and crown but it is considered preferable to carry out tests in relation to the crown as this is believed to be the main storage centre for carbohydrate reserves.

FIG. 2 illustrates the plot of a strike rate prediction curve and graphs TDS as a percentage against the strike rates.

The following prediction equation has been derived from the fitted values and may also be used to estimate strike rate once the TDS is known from a representative sample of strawberry plants.

The prediction equation is as follows:

$$E[\log(y/(1-y))]=-12.7936+151.5880*TDS$$

In this equation y is the strike rate and as an example, a typical right hand side for the equation would give a value of 5.39696 and this would result in a predicted value of strike rate of 0.9955. This equates to 99.55% strike rate.

While it will be appreciated from the foregoing that commercially available refractometers can be utilised to firstly determine TDS and then from this, the strike rate values can be obtained for a population of plants. On this basis, a box of plants can be rejected if the determined strike rate falls below an acceptable level, the view being that transplanting a box of plants having a low indicted strike rate will result in low yield. As an alternative to using a standard refractometer which includes a linear scale for determining the TDS values, the novel refractometer according to the present invention can be utilised and as can be seen above, according to the prediction equation, the relationship between TDS and strike rate is logarithmic. Accordingly, a logarithmic scale of strike rate can replace the normal linear scale having regard to the two constants referred to in the prediction equation. Under these circumstances, a direct reading of strike rate as a percentage can be obtained for each sample.

An example is illustrated in FIGS. 4A to 4D which show the visual indication that would be present on the specially designed refractometer.

Figure 4A:
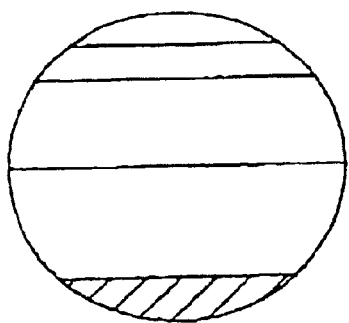
FIGS. 4A to 4D are schematic diagrams illustrating typical scales and readings from a direct readout refractometer for predicting strawberry plant strike rate.

The shaded area shown in FIG. 4A represents the visual indication for distilled water and is used to calibrate the refractometer to a zero line reading. As can be seen, the scale is divided into three logarithmic regions which correspond respectively to low, medium and high strike rate regions.

Figure 4B:
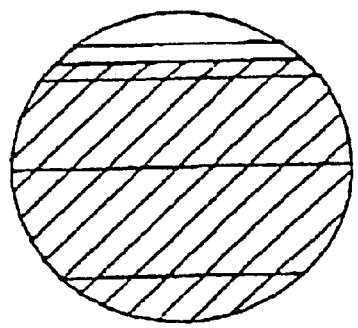
Figure 4C:
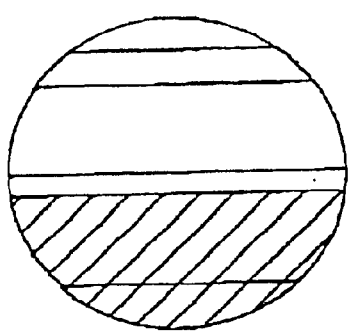
Figure 4D:
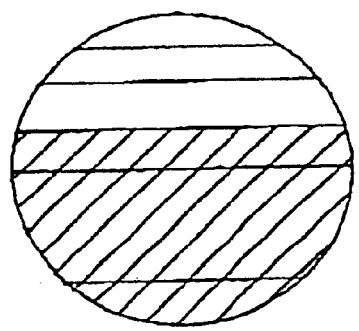

Thus, in FIG. 4B, the shaded area extends into the high strike rate region, in FIG. 4C into the low strike rate region and then into FIG. 4D into the medium strike rate region.

It is to be noted that measurements for TDS were also made in chilled boxes of runners that were retained in refrigeration for over six weeks. Sample readings of TDS were taken at four, five and six week intervals. Visual observations of plant discolouration were noted at each interval, reflecting chlorophyl ldepletion. It was discovered from this that when chlorophyll levels are high (yellowish green, bluish appearance) and TDS readings were high and storage time was a minimum, then strike rates were highest, but if chlorophyll levels were low (black with whitish buds) and although a higher TDS reading could be achieved, the strike rates still remain low. Thus, low chlorophyll levels resulted in low strike rates independent of high TDS readings. Contrast to this, if chlorophyll levels were high but the TDS was low, the strike rate was also poor. Clearly, another factor in relation to stress is the plant's overall condition. The present invention allows healthy plants to be culled.

Although TDS rose proportional to chiller storage time, it did not make the plants any more vigorous, because chlorophyll levels depleted proportional to time in the chiller. When the low chlorophyll plants were planted, loss occurred primarily due to chlorophyll depletion other than a plant being in a healthy fresh condition. The results of these tests are given in FIG. 3. The present invention therefore has its primary application in relation to healthy fresh runners.

The above illustrates application of the present invention to culling populations of plants received from runner nurseries and transplanting only those populations of plants which give a higher strike rate reading. Thus, a crop being transplanted following measurement, with all other factors being even, will result in a higher fruit yield on average compared with populations that have not been subjected to the present invention.

Figure 5:
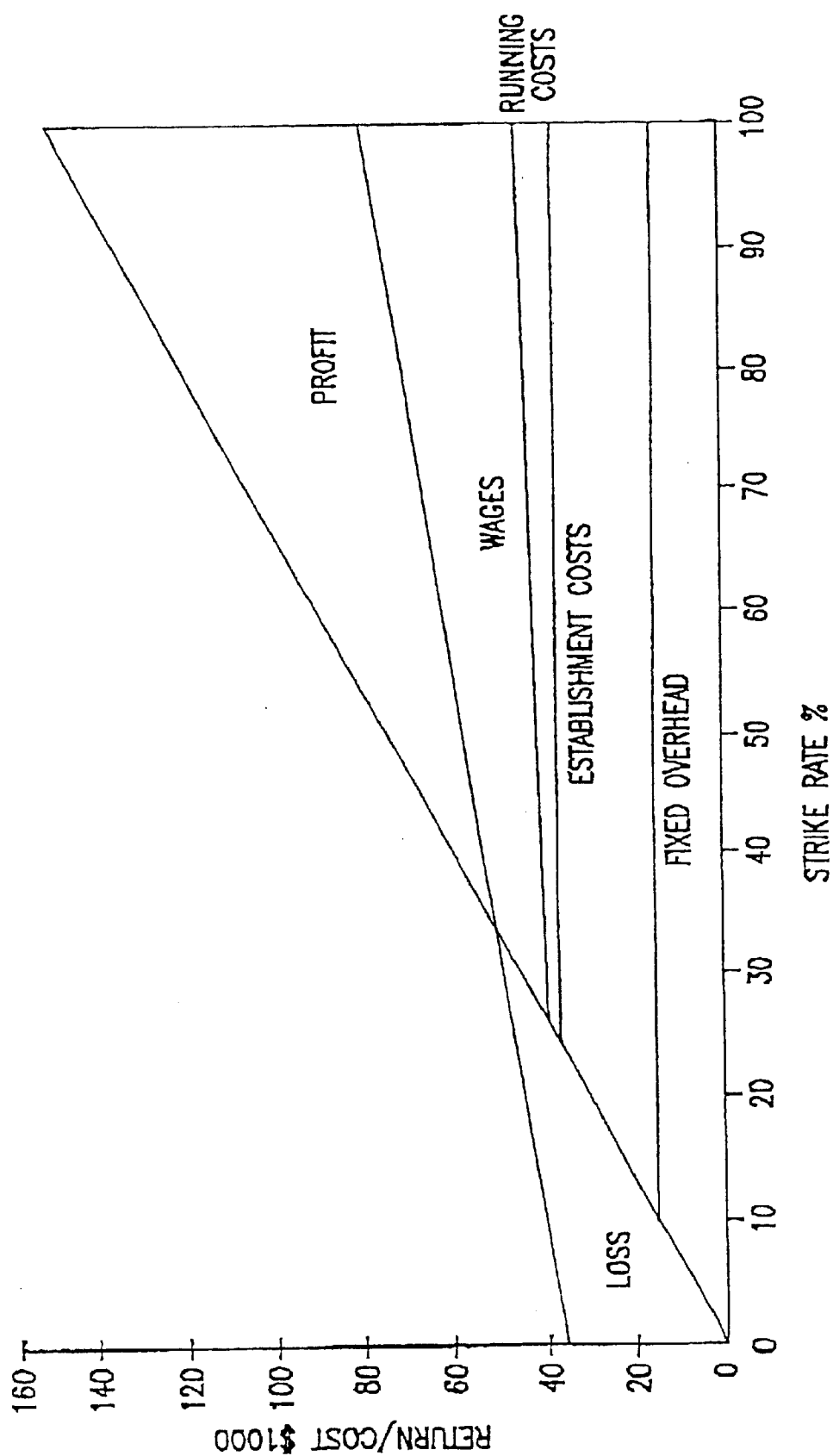
FIG. 5 is a diagram illustrating a break even analysis for the costs of running a strawberry plantation according to plant strike rate.

The importance of achieving a high strike rate is shown in FIG. 5 where the profit required to finance the following seasons crop is in the 95% to 100% strike rate range.

Notwithstanding the above, the present invention can be applied in other situations to enhance yield. As will be appreciated from the foregoing, discarding or culling plants which potentiate a low strike rate is an expensive waste of runners and by utilising the present invention prior to digging runners only those runners which are in the relatively high stress tolerance phase need be dug. The low tolerance phase runners can be dug once they have moved into the higher stress tolerance phase. The present invention also envisages artificially induced relatively high stress tolerance phase of growth and the applicant has discovered that this can be brought about by hormonal partitioning using a bio-regulator accompanied by periodic measurements of strike rate using the present invention before digging.

Figure 7:
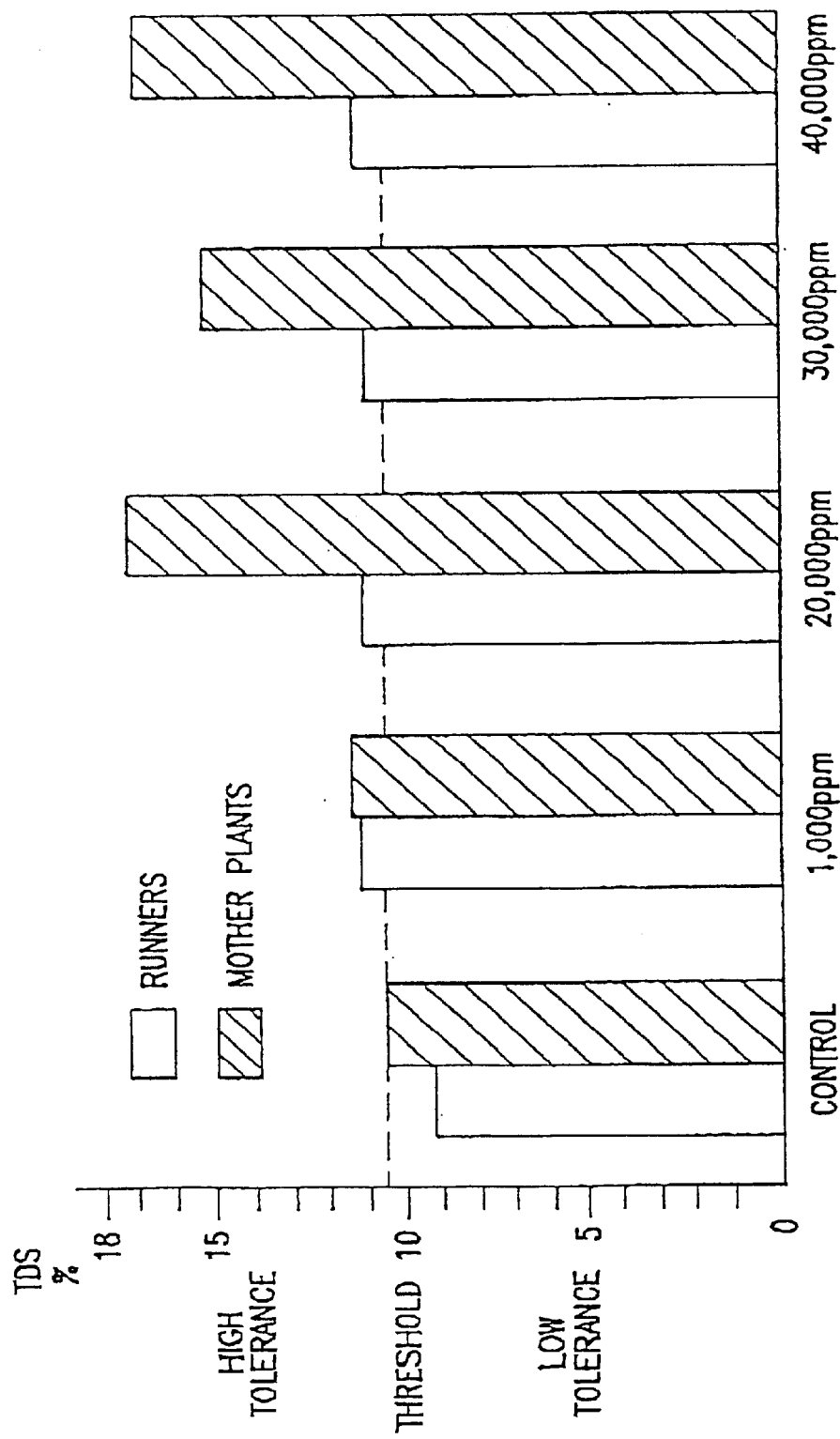
FIG. 7 is a graphical representation of the data given in the table of FIG. 6.
Figure 8:
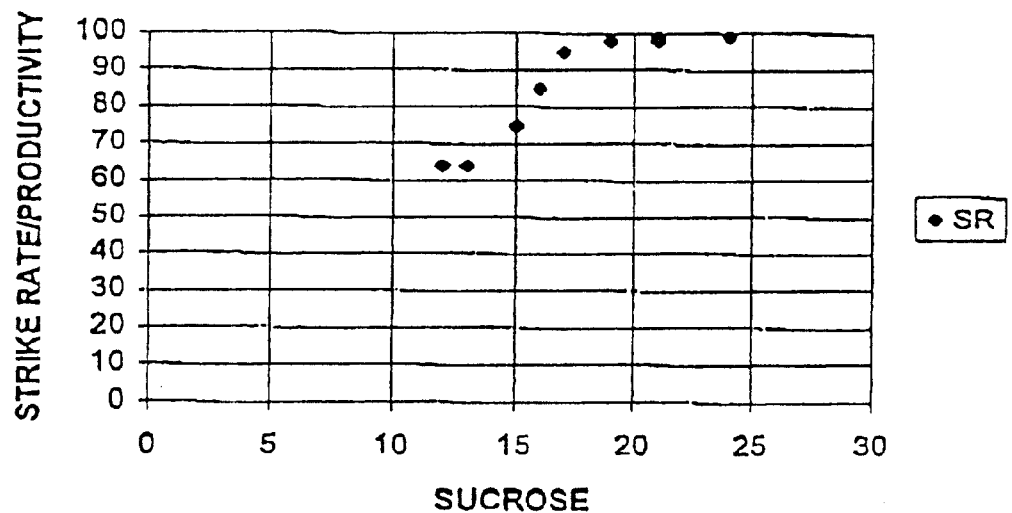
FIGS. 8 to 11 are graphs showing strike rates against individual sugar and BRIX measurements for strawberry plants.
Figure 9:
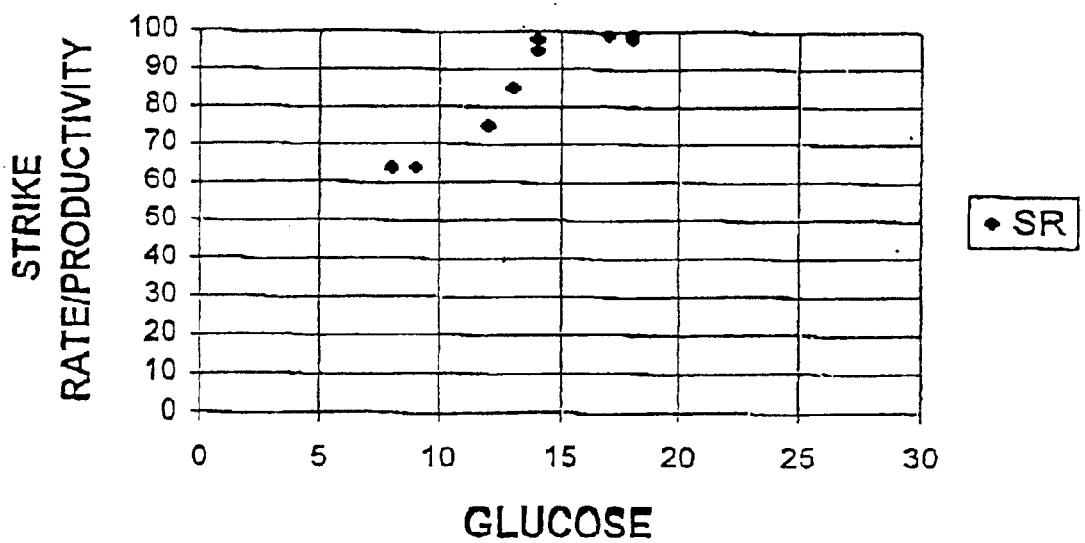
Figure 10:
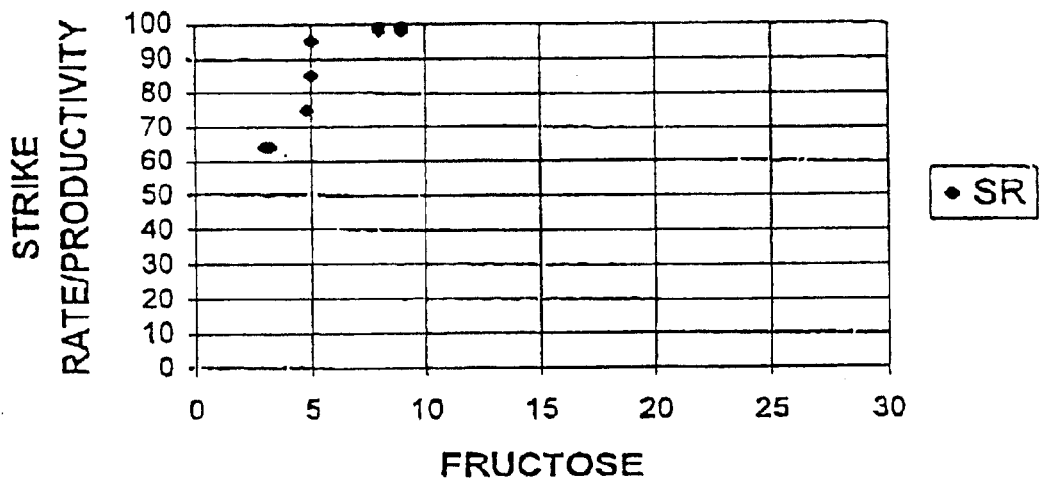
Figure 11:
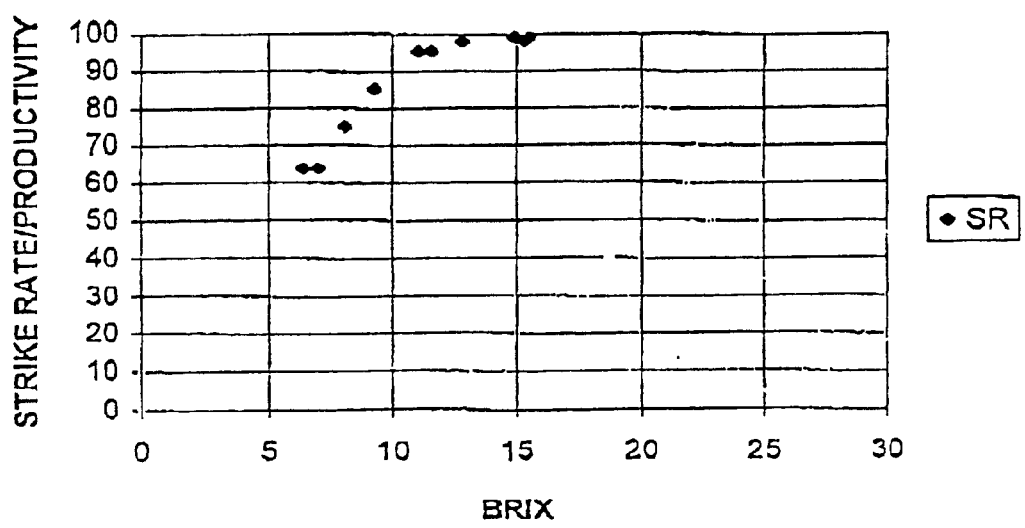
Figure 12:
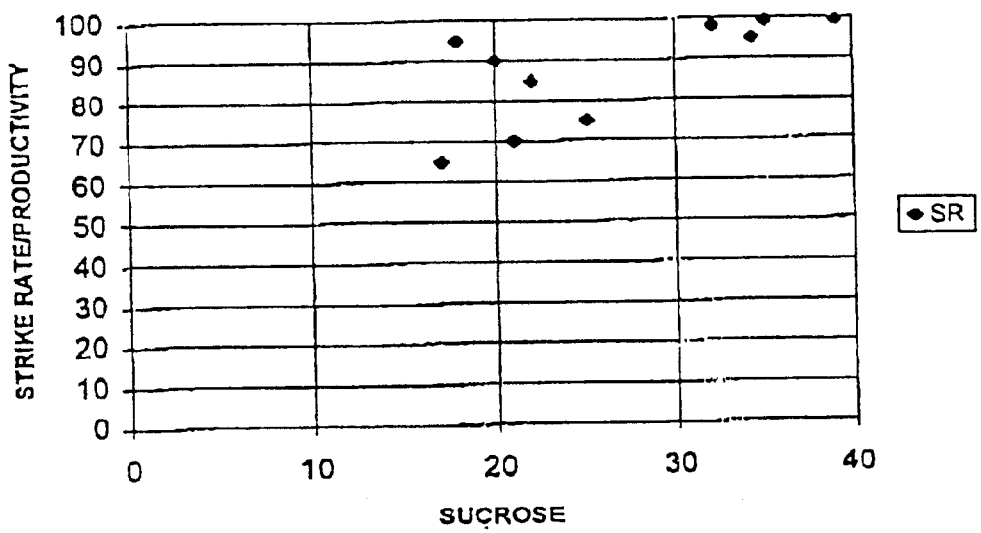
FIGS. 12 to 15 are graphs showing strike rates against individual sugar and BRIX measurements for Lychee trees.
Figure 13:
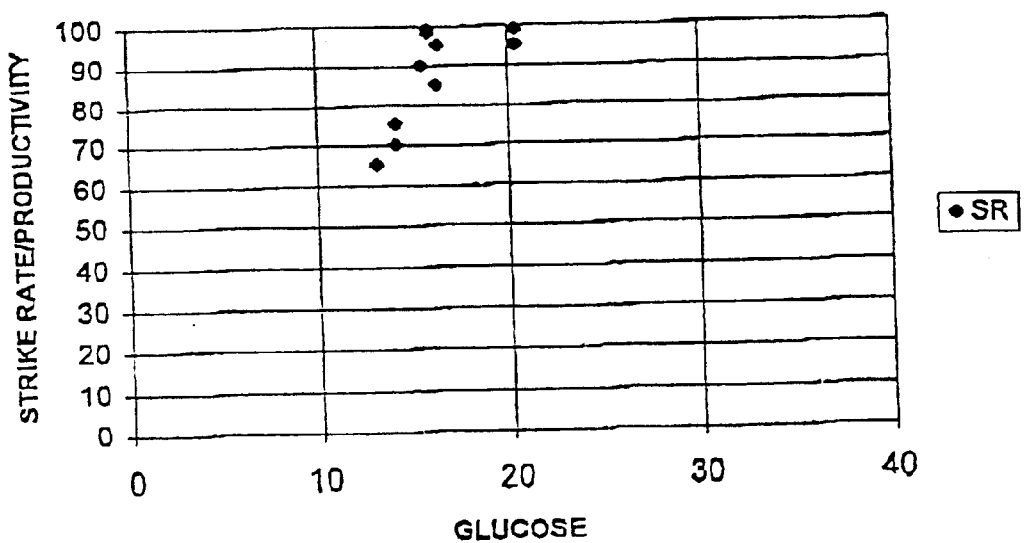
Figure 14:
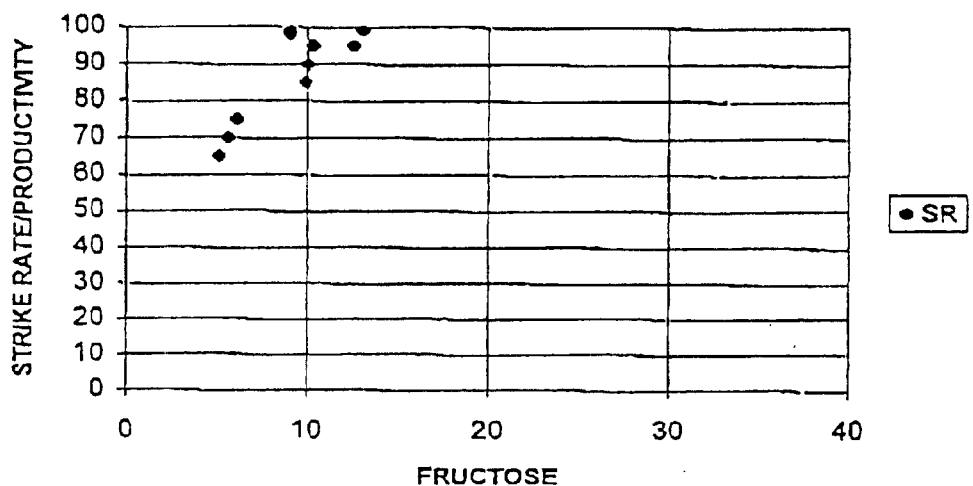
Figure 15:
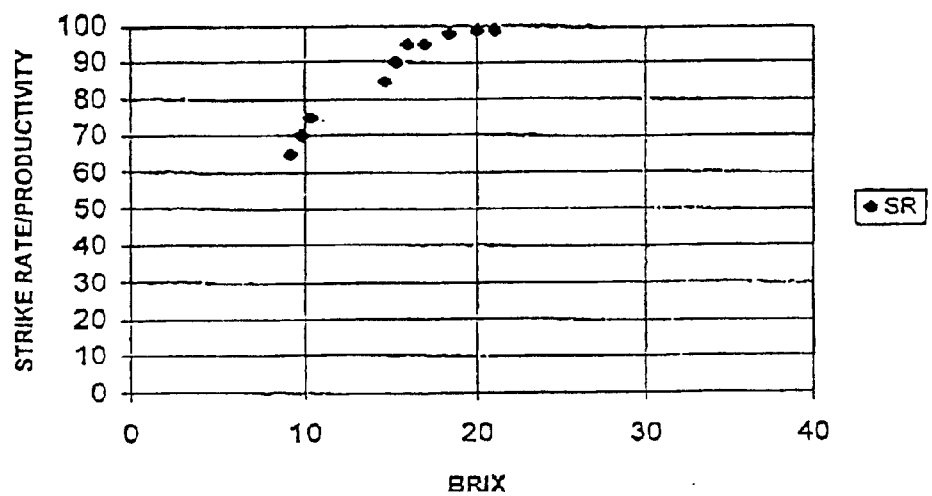

For example, results of a test conducted on strawberry runners is illustrated in FIGS. 6 and 7, five runner bed plots were selected with each plot being 2 m square. Due to the lateness of this test (June 1992) with resultant low temperatures, clear plastic sheets were suspended over the five beds to maintain night temperatures greater than 15° C. and daylight temperatures around 25° C.

The applied bio-regulator used was CCC at four different rates, 1000 ppm, 20000 ppm, 30000 ppm and 40000 ppm of water. To each spray mix, 0.1% of non-ionic wetting agent AGROL 60 was added.

One spray only by a hand held pressure spray was applied to dripping stage.

Bed 1 received the 40000 ppm, bed 2 the 30000 ppm, bed 3 the 20000 ppm, bed 4 the 1000 ppm and bed 5 was the control bed with no spray, however this bed was also covered with plastic in similar fashion to the other beds.

Untreated runners outside the plastic cover were retained for additional control readings.

Prior to spraying with the CCC, sample TDS readings were randomly taken of the beds of runners and the mother plants separately to measure carbohydrate levels.

The trivial name of the bio-regulator chosen for this test was chormequat chloride-cycocel or CCC. Its systematic name is (2-chloroethyl) trimethyl ammonium chloride.

TDS was measured in the crowns of sampled runners following the application of the bio-regulator and these measurements were taken seven days after application. The mother plants showed an increase in TDS over the seven days while the treated runners displayed similar results.

What is understood to have occurred is the partitioning hormone CCC triggered the plants into a storage phase, thereby causing the runner and mother plants to translocate sucrose into the crown, thereby increasing TDS, with the greatest increase of TDS at higher CCC concentration levels.

As it will be appreciated that the increase in the TDS under these circumstances can then be related back to the strike rate visible in FIG. 2 and once this artificially induced increase in TDS has been obtained above the required survival threshold, the runners can be dug and used for transplanting purposes and losses minimised. As will be seen from FIG. 7, the application of the bio-regulator has induced a TDS above the 10.5% threshold thereby improving stress tolerance and increasing strike rate from 80% to 95%. Induction in relation to the runners is independent of the amount of CCC used. However, in the mother plants, high CCC level resulted in marked increases in TDS. This is believed useful in relation to ratooning and this will be discussed below.

Another circumstance in which the present invention can be utilised is in relation to the process known as ratooning which involves pruning existing plants back to improve yield in the next season. Prior to the ratooning process, sample plants can be tested according to their TDS values and depending upon whether the TDS is above the threshold, ratooning can be delayed until the TDS has reached the threshold. Alternatively, artificially induced higher tolerance levels can be obtained using the format set out above in relation to the bio-regulator prior to ratooning. This is illustrated above in relation to the mother plants referred to in FIGS. 6 and 7 which are representative of induced stress tolerance in older plants. Once the bio-regulator has been used, further TDS tests can be conducted and once the TDS levels have increased sufficiently, the ratooning process can be carried out. Tests may not be needed but should be made in case unduly heavy dews or rains may have reduced the effectiveness of spray application of bio-regulator. Under these circumstances, on average, the plants will recover much quicker than if the ratooning process had been carried out using prior techniques with the chance of plants being in a relatively low stress tolerance phase. Using the present invention, plants will recover quicker and yield will be improved.

Other advantages of the bio-regulator which have been perceived by the applicants as being useful and beneficial are as follows:
1. Effects are measurable within one week;
2. Plants are sturdier and more compact;
3. Leaves are thicker and darker green indicating high chlorophyll levels;
4. Treated plants are more resistant to fungicidal and bacterial disease, e.g. verticillium wilt;
5. Flower size is usually not affected;
6. Plants show resistance to various insect pests, e.g. aphids;
7. The microbiology of the planting environment is not affected;
8. CCC decomposes quickly, is inactive after two weeks and is gone in less than a season; and
9. There is no effect on seed development or ripening.

In another embodiment of the present invention, the applicant uses an NIR probe sold as Model number ZX100F by Zeltex and a RFM340 refractometer sold by Bellingham & Stanley to measure sugar contents in Strawberry plants and Lychee plants, and to process strike rates thereof. Below are two tables showing the measurements (grams/100 millimetre), measured BRIX-values and corresponding strike rates (SR) for ten samples of strawberry plants and ten samples of Lychee trees:

| STRAWBERRY PLANT PRODUCTIVITY | | | | | |
|---|---|---|---|---|---|
| SAMPLE | SUCROSE | GLUCOSE | FRUCTOS | BRIX | SR |
| 1 | 24 | 17 | 8 | 14.88 | 99 |
| 2 | 21 | 18 | 9 | 15.5 | 99 |
| 3 | 19 | 14 | 8 | 12.77 | 98 |
| 4 | 17 | 14 | 5 | 11.49 | 95 |
| 5 | 15 | 12 | 4.8 | 8.12 | 75 |
| 6 | 13 | 9 | 3.2 | 7.03 | 64 |
| 7 | 21 | 18 | 9 | 15.31 | 98 |
| 8 | 12 | 8 | 3 | 6.4 | 64 |
| 9 | 17 | 14 | 5 | 11 | 95 |
| 10 | 16 | 13 | 5 | 9.3 | 85 |

| LYCHEE TREE PRODUCTIVITY | | | | | |
|---|---|---|---|---|---|
| SAMPLE | SUCROSE | GLUCOSE | FRUCTOS | BRIX | SR |
| 1 | 39 | 20.4 | 13 | 21 | 99 |
| 2 | 35 | 15.8 | 9 | 20 | 99 |
| 3 | 25 | 14 | 6 | 10.3 | 75 |
| 4 | 22 | 16.2 | 9.9 | 147 | 85 |
| 5 | 17 | 13 | 5. | 9.2 | 65 |
| 6 | 21 | 14 | 5.5 | 9.8 | 70 |
| 7 | 20 | 15.4 | 10 | 15.33 | 90 |
| 8 | 34.3 | 20.4 | 12.5 | 17 | 95 |
| 9 | 32.1 | 15.8 | 9 | 18.4 | 98 |
| 10 | 17.9 | 16.3 | 10.3 | 16 | 95 |

FIGS. 8 to 11 show graphically the individual sugar and Brix measurements against the strike rates of the strawberry plant table.

FIGS. 12 to 15 show graphically the individual sugar and Brix measurements against the strike rates of the Lychee tree table.

Figure 16:
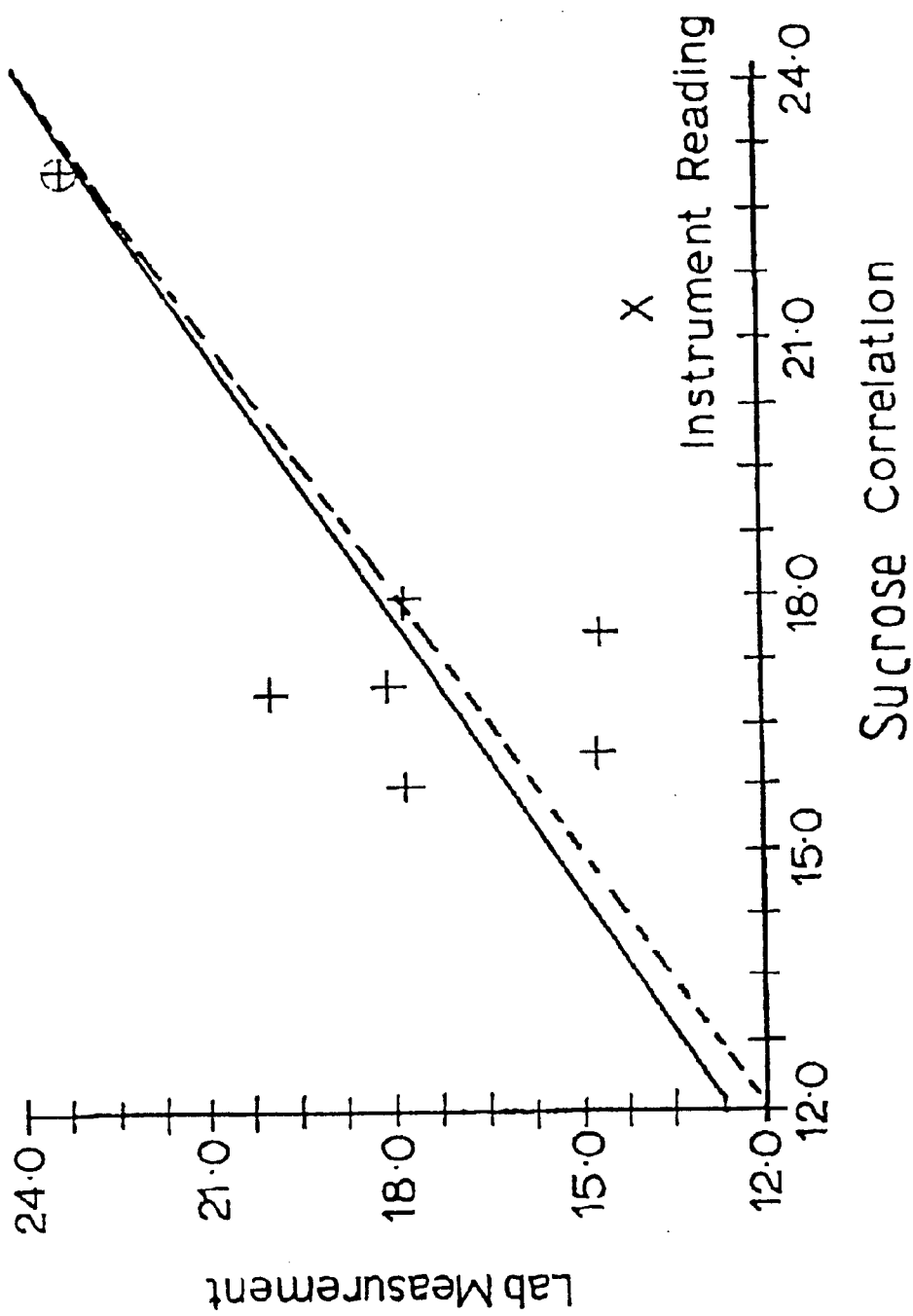
FIGS. 16 to 18 are graphs showing correlation results for individual sugars.
Figure 17:
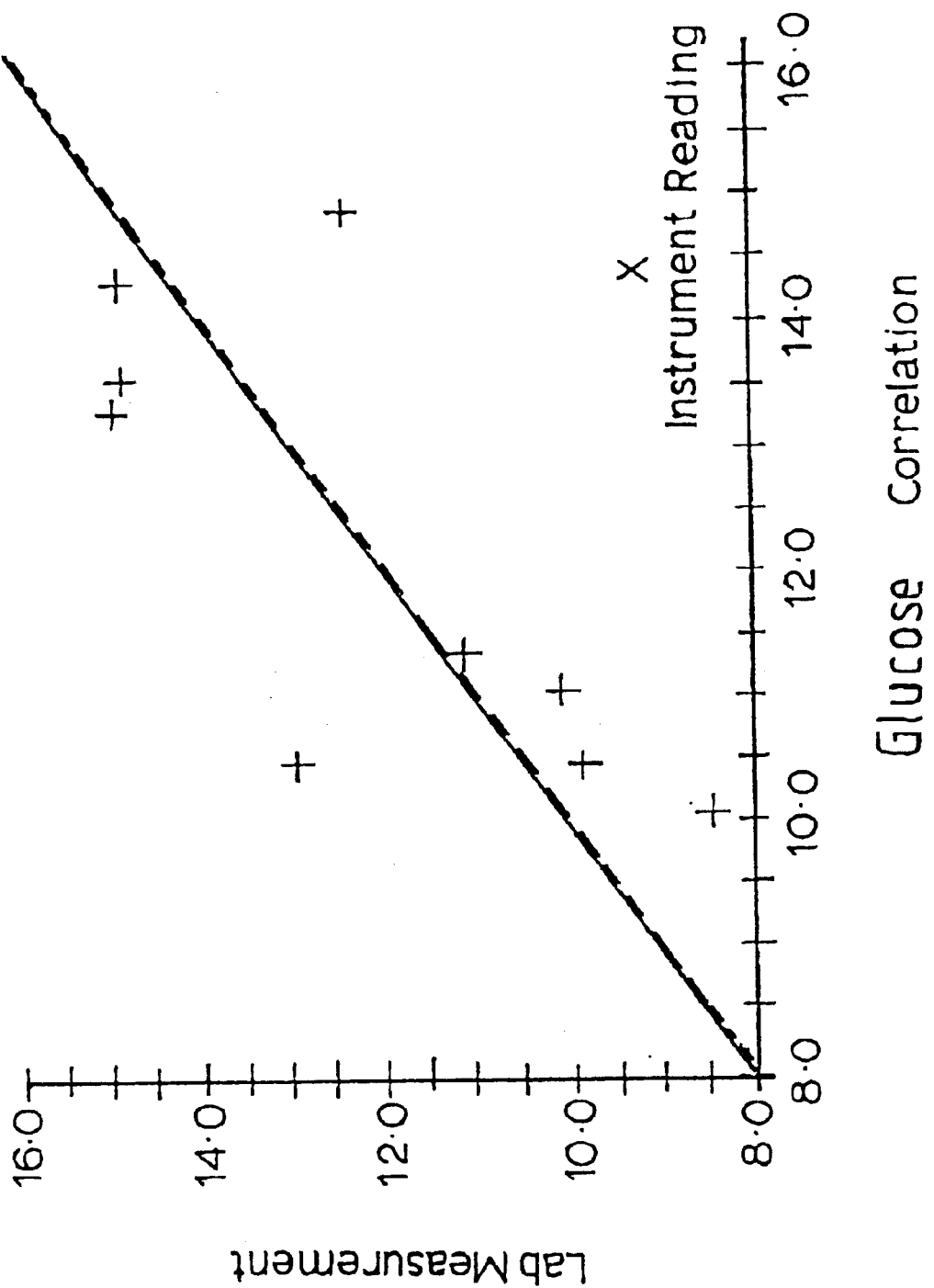
Figure 18:
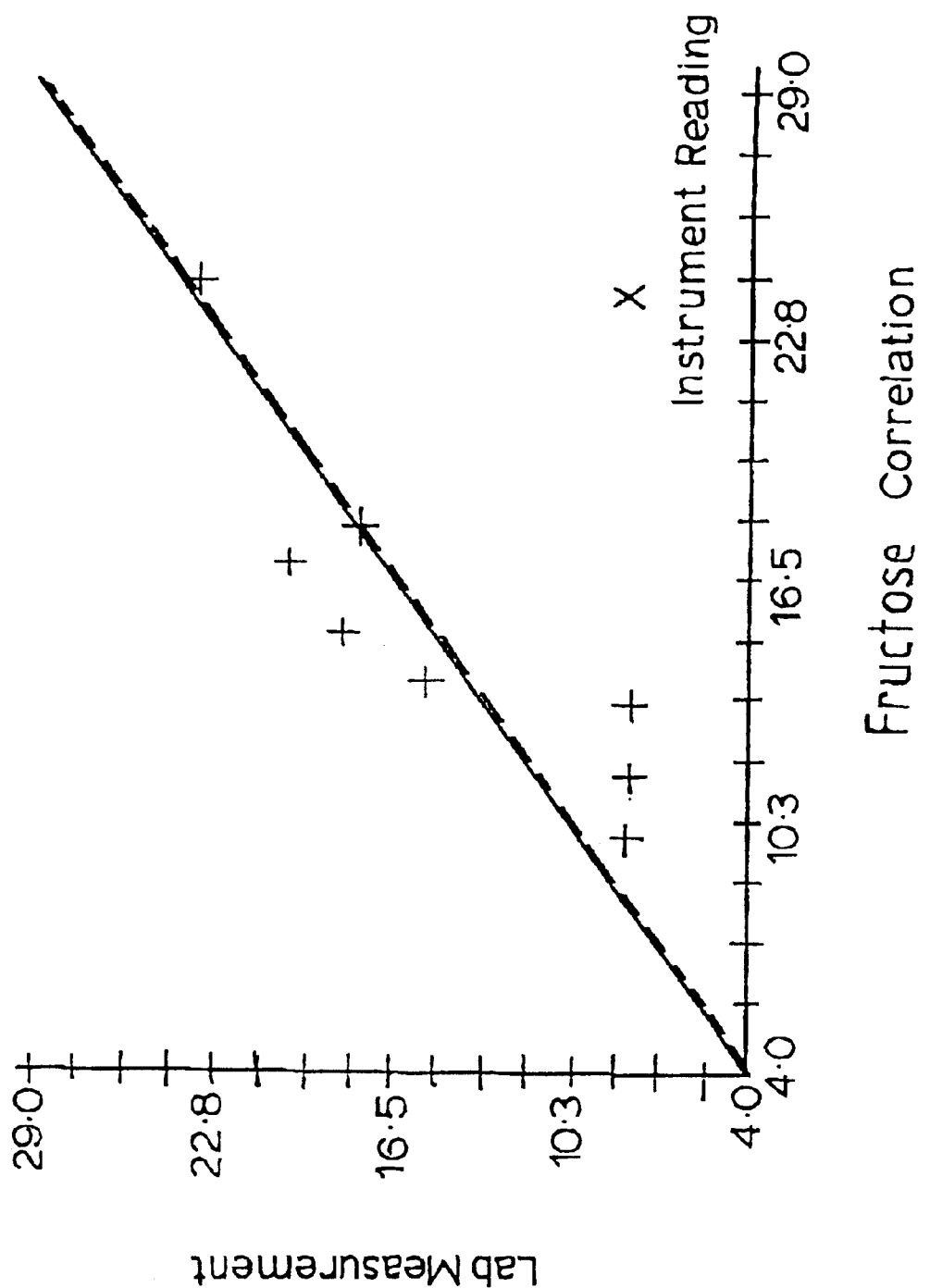

The applicant has observed the relationship between the sugar measurements and the strike rates. Examples show that the strike rates can be predicted when concentrations of the sugars in a plant are known. Laboratory measurements and field measurements using the ZX100F probe obtain correlation results for strawberry plants as shown in FIGS. 16 to 18. After slope and bias correlations the results are as follows:

| SUGAR | CORRELATION | STANDARD ERROR |
|---|---|---|
| Sucrose | 0.86 | 1.8 |
| Glucose | 0.75 | 1.7 |
| Fructose | 0.88 | 2.9 |

Therefore the strike rate of a plant can be predicted by measuring sugar contents, and processing the measured values with the appropriate correlations and the above mentioned relationship.

The applicant has developed a portable near infrared (NIR) spectrometer for measuring energy level of plants in-situ and non-destructively. The NIR spectrometer allows farmers to make real time measurements and crop management decisions in the field.

In one example the spectrometer was used to measure BRIX readings on stems of Fragaria sp. va Selva which is a variety of strawberry plant. The BRIX range of the tested samples was 4.03 to 9.86, and the relative sample population was n=171.

Calibrations were developed using partial least squares (PLS) in Grams-320 software. A comparison was made with and without data pretreatment but the most robust calibrations for the spectrometer included multiplicative scatter correction with 2 outliers from the sample population. The spectrometer achieved a coefficient of determination ($R^2$) of 0.59, a standard error of cross validation (SECV) of 1.02, a standard deviation residual (SDR) of 1.56 and a standard error of prediction (SEP) of 4.70. (The validation set used to calculate SEP consisted of 22 spectra extracted from the population and not used in calibration development.)

The spectrometer is in the shape of a 'gun' and takes the form of a backpack box having an Ocean Optics dual spectrometer, which uses a charged coupled device detector with a bandwidth from 650–1035 nm at 0.5 nm resolution. The 'front end' was designed to facilitate strawberry stem spectral acquisition such that the incoming fibre optic is incased in a hollow steel tube 2.5 mm in diameter and protrudes 30 mm from the light source. Transmittance (Reflectance) spectra are calculated as follows:

$$trans = \frac{[meas - (sunbefore + sunafter)]}{(ref\_lampON - 2*ref\_lampOFF)}$$

Where:

trans=relative transmittance spectra meas=the spectrum recorded from the probe with the lamp on and in the suns influence sunbefore=the spectrum recorded from the probe before the lamp has been turned on and when the sun is the only illuminating source sunafter=the spectrum recorded from the probe after the meas measurement has been recorded and the lamp has been turned off and when the sun is the only illuminating source ref lampON=the spectrum recorded from the lamp using a fibre probe positioned behind the lamp on the slave channel ref lampOFF=the spectrum recorded of the background (lamp off) using a fibre probe positioned behind the lamp on the slave channel (dark current).

In order to reduce the effects that sunlight might have on the resultant transmittance spectrum calculation, a residual is calculated for the spectrometer. The residual threshold can be adjusted, allowing the user to define when a spectrum is invalid. The calculation is:

Residual=2*(sunbefore$^{31}$ sunafter)/(sunbefore+sunafter)

The time required for one spectrum acquisition is approximately 3⁻4 seconds.

Partial least squares (PLS) is a well-known and established chemometric modeling technique used to develop calibrations between NIR spectra and sugars of whole fruit. The PLS facility in Grams~32 allows the user to select particular spectral regions, detect and remove outliers, and apply appropriate mathematical pretreatment. A comparison of the interpretive statistics arising from calibrations developed for Stem BRIX/NIR calibrations has been chosen as the most appropriate method for instrument comparison since this is the eventual purpose of the design.

Whole Selva strawberry plants were harvested and allowed to equilibrate to air-conditioned room temperature (approximately 22°C.) for 20 minutes. 645 samples were analysed from early to mid December 1998. Each day 20–30 plants were harvested, from which samples were extracted. Up to three samples were acquired from each plant. Each sample comprised five stems of similar age and size. Each stem was cut from the plant at approximately 10 mm above the crown and the leaf was cut off above the leaf/petiole forked junction.

Each sample was analysed with the spectrometer by placing the probe approximately 10 mm from the stem/leaf forked junction. The samples were presented to the spectrometer on a white ceramic tile and spectra acquired. The white tile reflected more light (compared to the black dish) back through the sample without saturating the detector. The incoming fibre optic probe was firmly pressed against each stem, pinning it to the white tile. 'Relative transmission' spectra (i.e. five spectra per sample) were downloaded and manually averaged in 'Spectra Solve'.

Samples were crushed in an hydraulic press. The extracted juice was analysed by a Bellingham and Stanley Digital Refractometer (RFM 340) and BRIX was recorded. All spectra were stored with their associated BRIX values and exported to Grams 32 for calibration development.

For calibration development, the population was created by randomly excluding samples until equally distributed populations based on BRIX were achieved. The resultant population for the spectrometer was: n 171, Brix range 4.03–9.86, mean 7.10, standard deviation 1.59.

Partial least squares (PLS1) in Grams 32 was the chemometric model employed for calibration development. Calibration experiments were carried out for four spectral windows. These spectral windows were 400 to 1700 nm, 600 to 1700 nm, 700 to 1700 nm and 650–1035 nm.

The 700–1700 mn bandwidth data (which is within the NIR region of the electromagnetic spectrum) was subjected to pretreatment experiments, for example with and without mean centering, Savitsky Golay 2nd derivative, standard normal variance with de-trend and multiplicative scatter correction.

$R^2$ (the coefficient of determination) and standard error of cross validation (SECV) were the two interpretive statistics extracted to enable a comparison since they are those most indicative of what can be expected of the performance of the associated calibration when an unknown sample is presented to it. The standard deviation residual (SDR) was also calculated (SDR=the standard deviation of the sample BRIX population divided by the SECV).

The best calibrations developed were subject to two outlier selection passes. Outlier selection was partially based on three plots in Grams 32.

1. Concentration residual versus the sample number for full cross validation, where the concentration residual is the difference between the actual and predicted brix values. Significantly different samples are potential outliers.

2. Spectral residual versus sample number for full cross validation, where the spectral residual is the sum of original spectrum absorbances subtract the PLS model predicted spectrum absorbances. Significantly different samples are potential outliers.

3. Studentised concentration residuals versus the leverage value for each sample in the calibration set. If a sample has both a high leverage and studentised residual, it is a potential outlier.

Spectra and BRIX values of potential outliers were examined, to ensure that these samples were inappropriate for calibration development.

Standard error of prediction (SEP) was calculated, using 22 sample spectra which were not used in calibration development, to validate the calibration performance for each first outlier pass/MSC calibration for both instruments.

Figure 19:
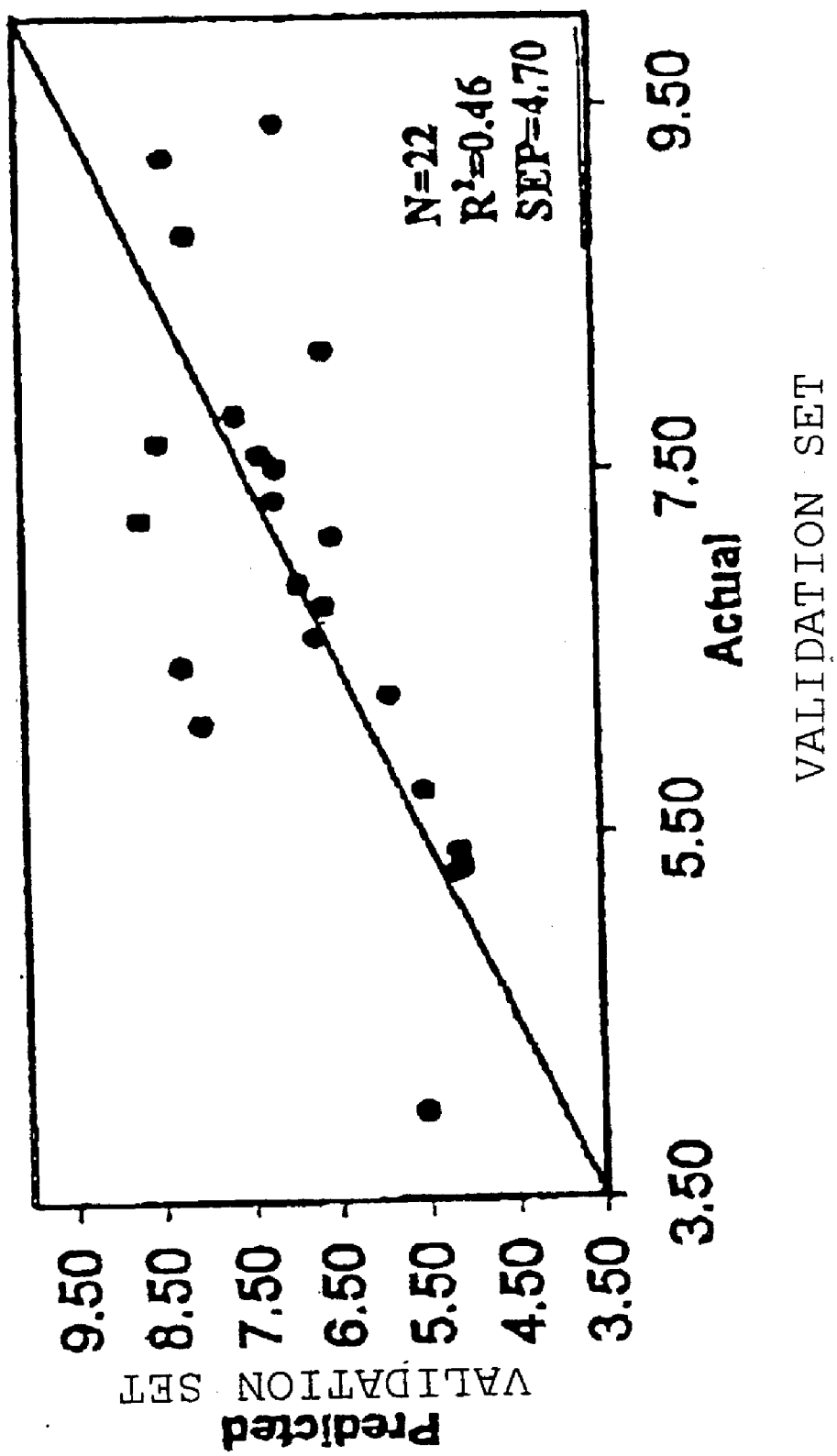
FIG. 19 shows the predicted versus the actual validation set.

Calibrations developed using multiplicative scatter correction yielded the best results and were subject to outlier selection The first outlier pass excluded two samples, the resulting calibration appearing less robust as shown in the following table. A second outlier pass selected another two samples for exclusion, the subsequent calibration exhibited negligible changes. The first outlier pass calibration was chosen to predict the validation set as shown in FIG. 19.

Because MSC attempts to remove the effects of scattering by linearising each spectrum to some ideal spectrum of the sample, it is expected to have reduced the effects of scattering within the strawberry stem samples.

With no pretreatment the whole spectrum for spectrometer in the range 650–1035 nm $R^2$=0.58, SECV=1.03, SDR= 1.54.

| TREATMENT | FACTORS | R-SQUARE | SECV | SDR |
|---|---|---|---|---|
| standard | 7 | 0.58 | 1.03 | 1.54 |
| no mc | 7 | 0.48 | 1.17 | 1.36 |
| no mc SNV-DT | 6 | 0.56 | 1.06 | 1.50 |
| SNV-DT | 6 | 0.60 | 1.01 | 1.57 |
| no mc MSC | 8 | 0.60 | 1.00 | 1.59 |
| MSC | 7 | 0.60 | 1.00 | 1.59 |
| MSC 1$^{st}$ outlier out: 17, 28 | 6 | 0.59 | 1.02 | 1.56 |
| MSC outlier out: 66, 103 | 6 | 0.59 | 1.01 | 1.56 |

The correlation reveals a general trend that the 600 to 1700 and 700 to 1700 nm regions were equally well suited since they provided equally the best results for when no pretreatments were used.

It will be appreciated from the foregoing examples of how the present invention can be used to create an improved crop that the present invention has general application. Therefore the above has been given by way of illustrative example of the present invention and many variations, modifications and different applications of the present invention will be apparent to those skilled in the art without departing from the broad ambit and scope of the invention as set forth in the appended claims.

What is claimed is:

1. A process for reducing plant loss or enhancing plant recovery after subjecting a plant to artificially induced stress, the process comprising the steps of:

(a) prior to subjecting the plant to the artificially induced stress, quantitatively confirming that the plant is in a relatively high stress tolerance phase by determining the state of the plants' energy reserves according to a measurable internal characteristic of said plant, said measurable internal characteristic being indictive of the plant being in said relatively high stress tolerance phase; and (b) subsequently subjecting the plant to the artificially induced stress before said plant enters a relatively low stress tolerance phase.

2. The process according to claim 1 wherein the measurable characteristics is a measure of the total dissolved solids in a plant juice sample.

3. The process according to claim 1 wherein the measurable characteristic is a measure of the carbohydrate levels in the plant.

4. A culling process for eliminating a high proportion of plants having relatively low stress tolerance from a plurality of independent plant populations, each plant population comprising a plurality of plants which are of the same production lot from a specific source, the culling process comprising the steps of:

(a) selecting a representative sample of plants corresponding to each population;

(b) quantitatively ascertaining whether said representative sample of plants is in a relatively low stress tolerance phase or a relatively high stress tolerance phase by determining the state of the plants' energy reserves according to a measurable internal characteristic of said plants in said sample, said measurable internal characteristic being indicative of the plants' tolerance to stress; and p1 (c) subsequently culling those populations of plants that correspond to the representative sample of plants which have been ascertained as being in a relatively low stress tolerance phase.

5. The culling process according to claim 4 wherein the measurable characteristic is a measure of the total dissolved solids in a plant juice sample.

6. The process according to claim 4 wherein the measurable characteristic is a measure of the carbohydrate levels in the plant.

7. A process for preparing and selecting plants suitable for being subjected to artificially induced stress such as transplanting or pruning, the process including the steps of:

(a) selecting a representative sample of plants from a plant population, the plants of which are from the same production lot from a specific source;

(b) quantitatively ascertaining whether said plants in said representative sample are in a relatively high stress tolerance phase or a relatively low stress tolerance phase by determining the state of the plants' energy reserves according to a measurable internal characteristic of said plants in said sample, said measurable internal characteristic being indicative of said plants being in a relatively low or a relatively high stress tolerance phase;

(c) where said plants in said sample are shown to be in a relatively low stress tolerance phase, select all said plants in said population as being substantially stress intolerant and set them aside as being unsuitable to be subjected to said artificially induced stress; and (d) where said population has been shown to be in a relatively low stress tolerance phase then subject said population to a process adapted to artificially induce a relatively high stress tolerance phase in said stress tolerant population;

(e) subsequently select a further representative sample from said population that has been subjected to said process adapted to artificially induce a relatively high stress tolerance phase;

(f) quantitatively ascertain whether said plants in said further representative sample have reached an induced relatively high stress tolerance phase according to a measurable internal characteristic of said plants in said further representative sample, said measurable internal characteristic being indicative of a plant being in a relatively high or relatively low stress tolerance phase; and (g) where said plants in said further sample are shown to be in a relatively high stress tolerance phase select all said plants in said population as having been successfully artificially induced into a relatively high stress tolerance phase as being substantially stress tolerant and set them aside as being suitable to be subjected to said artificially induced stress.

8. The process according to claim 7 wherein the measurable characteristic is a measure of the total dissolved solids in a plant juice sample.

9. The process according to claim 7 where step (e) involves applying a bioregulator at periodic intervals until said plants reach an induced relatively high stress tolerance phase.

10. The process according to claim 7 wherein step (e) involves applying a hormonal agent to trigger the plants to move from a growth phase to a storage phase.

11. The process according to claim wherein the measurable characteristic is a measure of the carbohydrate levels in the plant.

* * * * *